US011767259B2

(12) United States Patent
Justus et al.

(10) Patent No.: US 11,767,259 B2
(45) Date of Patent: Sep. 26, 2023

(54) METHOD OF MANUFACTURE OF COPPER-DOPED GLASSES

(71) Applicant: The Government of the United States of America, as represented by the Secretary of the Navy, Arlington, VA (US)

(72) Inventors: Brian L. Justus, Springfield, VA (US); Alan L. Huston, Aldie, VA (US); Barbara A. Marcheschi, Fairfax Station, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 376 days.

(21) Appl. No.: 17/117,681

(22) Filed: Dec. 10, 2020

(65) Prior Publication Data

US 2021/0094872 A1    Apr. 1, 2021

Related U.S. Application Data

(62) Division of application No. 16/156,569, filed on Oct. 10, 2018, now Pat. No. 11,028,016, which is a division of application No. 15/432,387, filed on Feb. 14, 2017, now Pat. No. 10,125,048.

(60) Provisional application No. 62/297,685, filed on Feb. 19, 2016.

(51) Int. Cl.
*C03C 23/00* (2006.01)
*C03C 4/12* (2006.01)
*C09K 11/02* (2006.01)
*C09K 11/58* (2006.01)
*C03C 21/00* (2006.01)
*C03C 3/06* (2006.01)
*C03C 3/076* (2006.01)
*C03C 14/00* (2006.01)

(52) U.S. Cl.
CPC .............. *C03C 23/002* (2013.01); *C03C 3/06* (2013.01); *C03C 3/076* (2013.01); *C03C 4/12* (2013.01); *C03C 14/006* (2013.01); *C03C 21/008* (2013.01); *C09K 11/025* (2013.01); *C09K 11/582* (2013.01); *C03C 2201/40* (2013.01)

(58) Field of Classification Search
CPC ......... C03C 23/002; C03C 3/06; C03C 3/076; C03C 4/12; C03C 14/006; C03C 21/008; C03C 2201/40
See application file for complete search history.

(56) References Cited

U.S. PATENT DOCUMENTS 3,347,704 A * 10/1967 Meyer ................... C04B 37/026
106/1.12
4,525,387 A * 6/1985 Ebata ................... C04B 41/5127
427/427
5,811,822 A * 9/1998 Huston ..................... G01T 1/10
250/483.1

* cited by examiner

*Primary Examiner* — Noah S Wiese
(74) *Attorney, Agent, or Firm* — US Naval Research Laboratory; Stephen T. Hunnius

(57) ABSTRACT

A copper-doped glass formed by placing a target glass in a container, surrounding the target glass with a powder mixture comprised of $SiO_2$ powder and $Cu_2S$ powder, wherein the $SiO_2$ powder and the $Cu_2S$ powder are mixed according to the formula $(SiO_2)_{(1-x)}(Cu_2S)_x$, where $0.01<x<0.1$, and heated to a temperature of between 800° C. and 1150° C. for a duration of between 1 and 10 hours.

8 Claims, 1 Drawing Sheet

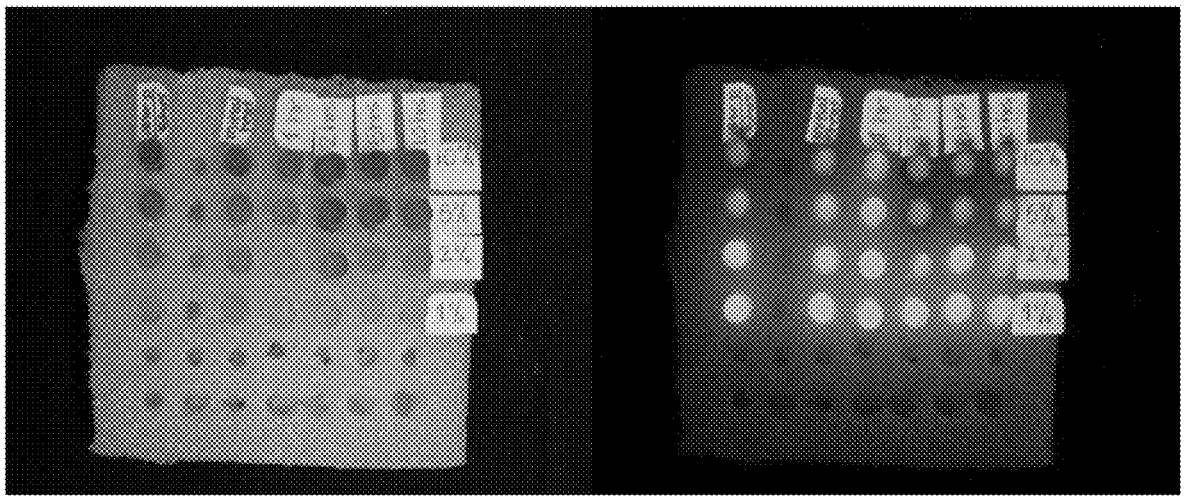

METHOD OF MANUFACTURE OF COPPER-DOPED GLASSES

This application claims priority to and the benefits of U.S. Patent Application No. 62/297,685 filed on Feb. 19, 2016, and U.S. patent application Ser. No. 15/432,387 filed on Feb. 14, 2017, issued on Nov. 13, 2018 as U.S. Pat. No. 10,125,048, and U.S. patent application Ser. No. 16/156,569 filed on Oct. 10, 2018, the entirety of each is herein incorporated by reference.

BACKGROUND

The fabrication of luminescent glasses doped with metal ions and, in particular, copper ions has been of significant interest for many years. In the early 1980's luminescent copper-doped glasses were investigated for their potential utility as laser gain media. In addition to high luminescent quantum yield, the glasses studied required macroscopic dimensions (mm-cm size range) and excellent optical quality (minimal scattering and/or absorption losses).

Copper can exist in glass in at least three oxidation states: $Cu^0$, $Cu^{+1}$ and $Cu^{+2}$, but only $Cu^{+1}$-doped glass was considered for laser development because $Cu^{+1}$ is the only ion that does not introduce unwanted absorption bands at the visible wavelengths of interest. Copper doping of glasses other than silica glass, including for example, silicate, borate, and phosphate glasses, has typically been accomplished by mixing the component raw materials in a crucible, heating the components until they melt, and then cooling the liquid mixture to form a glass [Zhang, 1990; Boutinaud, 1991; Tanaka, 1994; Sharaf, 1994]. The final oxidation state of the copper dopants in the glass was found to be critically dependent on the composition of the mixture and the melting parameters, such as the temperature and the environment. Mixtures melted in air (an oxidizing environment) favored the formation of $Cu^{+2}$ ions. However, the $Cu^{+2}$ ions were characterized by broad absorption bands in the visible that caused the glass to appear colored, and the $Cu^{+2}$ absorption represented a significant optical loss that could prevent laser operation. $Cu^{+1}$ doping is preferred because it provides an optically clear glass since the absorption band of $Cu^{+1}$ is in the ultraviolet. However, the fabrication of $Cu^{+1}$-doped glass is more difficult than $Cu^{+2}$-doped glass [Boutinaud, 1991]. Reducing conditions must be used during the glass melting step in order to favor the formation of $Cu^{+1}$. If the reducing conditions are not strong enough, then even small concentrations of residual $Cu^{+2}$ ions can interfere with laser operation because the Cu' ions have an ultraviolet absorption band (in addition to the broad visible absorption band).

The ultraviolet absorption of the $Cu^{+2}$ ions overlap with the ultraviolet absorption band of the $Cu^{+1}$ ions, and thus competes with the optical excitation of the $Cu^{+1}$ ions [Tanaka, 1994]. On the other hand, if the reducing conditions are too strong, then colloidal crystals of $Cu^0$ can form. These colloidal crystals can cause the glass to have a ruby red color with low concentrations [Sharaf, 1994]. Higher concentrations of the colloidal crystals can cause the color of the glass to become black [Tanaka, 1994]. Even if the reducing conditions are carefully controlled, i.e., by the addition of $NH_4H_2PO_4$ in order to provide a reducing environment, it was found that these chemicals decomposed and interfered with the $Cu^{+1}$ emission of the glass [Tanaka, 1994].

The current state of the art for the fabrication of optically transparent, luminescent copper-doped silicate-based glasses that contain only monovalent copper is still problematic. The technical problems associated with obtaining only $Cu^{+1}$ doping, as outlined very briefly above, have not been solved.

Other researchers have attempted to fabricate luminescent glasses containing only $Cu^{+1}$ ions by doping copper into silica glass, but have had to address similar technical difficulties [Debnath 1989; Chaudhuri, 1994; Fujimoto, 1997; Garcia, 2001; Brownlow, 1981]. Debnath and Das [Debnath, 1989] prepared luminescent, $Cu^{+1}$-doped silica glass by soaking pieces of porous silica glass in solutions (presumably aqueous, but not specified) of a copper complex (again, the starting chemical was not specified). The porous host glass is not pure silica, but is typically ~96% silica (e.g. Corning Vycor® glass). The impregnated glass was allowed to dry and then was sintered at 1000 C-1200 C under an inert gas environment. The copper-doped glass prepared by this method was shown to be radiation sensitive, but the sensitivity was quite low [Debnath, 1995], indicating that the glass had a low concentration of trap and/or luminescence centers.

Fujimoto and Nakatasuka [Fujimoto, 1997] fabricated luminescent, copper-doped silica glass using a sol-gel technique. It is generally known [Fujimoto, 1997] that dopants are not readily dispersed homogeneously in silica glass. For example, the homogeneous dispersion of Nd ions in silica is quite difficult, and the Nd ions will agglomerate in silica glass at low concentration. Dispersion of the Nd ions is aided by the addition of a co-dopant ion, such as aluminum. Fujimoto mixed tetraethyl-orthosilicate hydrolyzed with hydrochloric acid, with colloidal silica. He then added an ethanol solution of copper chloride and uniformly mixed it. In this approach, the copper ions are uniformly dispersed before the glassy network is formed. The gel was dried and then sintered. The resulting luminescent, copper-doped silica glass contained both $Cu^{+2}$ and $Cu^{+2}$ ions. Garcia also used a sol-gel fabrication method to prepare luminescent, thin films of $Cu^{+1}$-doped silica [Garcia, 2001]. Brownlow and Chang reported [Brownlow, 1981] the fabrication of luminescent $Cu^{+1}$-doped silica glasses using a method whereby silicic acid was mixed with copper and aluminum nitrates in water and then reacted at 1200 C in wet nitrogen gas. The authors could not explain why aluminum, gallium or hydroxyl co-dopants were required to activate the $Cu^{+1}$ luminescence in the silica glass host.

Photoluminescent silica glasses were prepared by doping silica glass with copper ions via ion implantation [Fukumi, 1998]. Copper ions were implanted to a depth of less than a micrometer from the surface using an accelerator operating at 2 MeV. X-ray absorption fine structure spectroscopy was performed in order to study the structure and bonding of the copper-doped silica. Fukumi found that the oxidation state of the copper was $Cu^{+1}$ and that each copper ion was coordinated by two oxygen atoms. Fukumi reported that co-implantation of oxygen ions stabilized the $Cu^{+1}$ ions in the silica glass and increased the photoluminescence intensity.

Copper-doped silica glasses have also been fabricated and used for applications besides the development of laser gain media. For example, [Huston, 1998] describes the development of copper-doped glasses that were used for the detection of ionizing radiation using optically stimulated luminescence (OSL) and thermoluminescence (TL). In the description, above, of the development of copper-doped glasses for use as potential laser gain media, the required properties of the glasses included high $Cu^{+1}$ photoluminescence yield, low background absorption due to $Cu^{+2}$ ions or other additives, and the ability to make bulk-size samples with homogeneously dispersed dopants. Copper-doped glasses for the detection of ionizing radiation by OSL or TL have similar requirements, except that maximizing the photoluminescence yield is not critical. A material with sensitive OSL and/or TL properties must possess a high concentration of trapping centers that are capable of storing trapped charges for long periods of time, in addition to luminescence centers that exhibit photoluminescence. The copper-doped silica glasses described by Huston [Huston, 1998] were extremely well-suited for detection of radiation using optically stimulated luminescence (OSL) and thermoluminescence (TL) methods and therefore possessed significant populations of trapping centers. In one embodiment, fused silica glasses were doped with $Cu^{+1}$ using a novel thermal diffusion method that involved coating the silica glass with a thin layer of copper sulfide-doped sol-gel glass and then heating the coated glass at temperatures high enough to cause diffusion of copper atoms into the silica glass. Another embodiment of the thermal diffusion method [Huston, 2000] required first doping porous Vycor glass powder with metal ion dopants and then using that doped powder as the source of copper in the thermal diffusion of dopants in fused silica glass. In this procedure, the porous Vycor glass powder was immersed in a solution of $CuSO_4$, dried, and then exposed to $H_2S$ to create CuS in the pores of the glass powder. The $H_2S$ was provided directly or by the decomposition of thioacetamide. The doped Vycor powder was packed around a fused silica glass sample and heated to a temperature of 1100 C. The $Cu^{+1}$ ions dope the fused silica glass by thermal diffusion.

Both of these thermal diffusion methods yielded extremely low concentrations of $Cu^{+1}$ ions in the glass (Huston referred to the methods as "seasoning" the glass). However, it was found that very small amounts of $Cu^{+1}$ ions in the glass were sufficient "to cause significant and useful OSL activity." It was apparent that, even at extremely low dopant concentration, the doped glasses were capable of storing trapped charges and the trapped charges could be released in response to an optical or thermal stimulation, resulting in OSL or TL. Although these copper-doped glasses were well-suited for OSL and TL methods of radiation detection, their utility for scintillator applications was limited to very specific applications because their radioluminescence yields were less than those of most other inorganic and organic scintillators. As an example, an application that required the detection of radioluminescence from the copper-doped glass was the gated detection of radiation produced by a medical linear accelerator [Justus, 2004]. An optical fiber dosimeter was developed that used a copper-doped glass fiber sensor. The gated detection technique succeeded, despite the extremely low radioluminescence signals, because highly sensitive photon counting modules were used to detect the weak signal. In addition, the thermal diffusion methods described above yielded doped glasses with significant spatial concentration gradients and/or inhomogeneities. The concentration gradients were presumably caused by depletion of the copper atoms in the sol gel film and/or the Vycor powder.

BRIEF SUMMARY OF THE INVENTION

The present invention describes new copper-doped glasses possessing favorable properties that are different from, and in several respects superior to, previously taught copper-doped glasses. The invention also teaches a new method for the manufacture of all types of copper-doped high temperature glasses, including fused silica glasses and other silicate-based glasses. The invention teaches a new copper composite dopant delivery powder comprised of fused silica powder and $Cu_2S$ powder that enables the new method for the manufacture of copper-doped glasses. Finally, the invention describes improved methods for thermally diffusing high concentrations of copper into glass at temperatures that are well below the softening point of the glass.

The doped target glasses prepared by this method are highly luminescent when exposed to ultraviolet light (in this case the luminescence is called photoluminescence) or ionizing radiation (in this case the luminescence is called scintillation or radioluminescence).

In addition, exposure to ionizing radiation causes ionization of a fraction of the copper ions in the glass followed by trapping of the electrons at defects (metastable traps) in the glass. These populated traps can persist for extended periods of time. Release of the trapped electrons, followed by luminescent recombination of the electrons with the ionized $Cu^{++}$ ions, can be induced by heating, termed "thermoluminescence" (TL), or by exposure to light, termed "optically stimulated luminescence" (OSL).

Due to their scintillation, TL and OSL properties, these glasses have applications in many areas including the detection of ionizing radiation, radiation dosimetry, radiographic imaging, holographic storage and nonlinear optics.

The new copper dopant delivery powder is formulated from fused silica powder and $Cu_2S$ powder. The powders are mixed in varying ratios of $Cu_2S$-to-silica $((SiO_2)_{(1-x)}(Cu_2S)_x)$. The powder is ground to produce a uniformly mixed powder comprising of particles as small as 10 nm and as large as 50 um. The powder mixture is then heated to a temperature of 1100 C. The resulting material is a solid gray mass that is crushed and milled to yield a uniform dopant delivery powder with particle sizes between 10 nanometers and 10 microns.

The dopant delivery powder is a new material that is composed of $SiO_2$, CuS, $Cu_2S$, CuO, and $Cu_2O$, with copper concentrations that can be varied from 0.001 weight percent to 10 weight percent, depending on the initial fraction of $SiO_2$ and $Cu_2S$. We will refer to the new composite dopant delivery powder as "SiO·CuS."

The copper concentrations that can be obtained in this new dopant delivery powder are up to three orders of magnitude greater than the copper concentrations achieved in the prior art [Huston, 1998; Huston, 2000], which offers a great advantage when used as a source of copper atoms for thermal diffusion of copper into high temperature glasses.

The concentration of copper available to be diffused into the target glass can be readily controlled by the ratios of starting materials ($Cu_2S$ and $SiO_2$) used to formulate the dopant delivery material.

The fabrication of the new copper-doped glasses taught in this invention involves placement of the target glass inside of a fused silica tube, alumina crucible, or other suitable container, packing the composite SiO·CuS dopant powder around the target glass and then heating the crucible, glass and SiO·CuS dopant powder to a temperature of between 800° C. and 1150° C. for a period of time that is determined by the type of target glass, the concentration of copper in the dopant delivery powder, the chosen temperature and thickness/volume of the glass to be doped. It is important to note that thermal decomposition of copper sulfide can occur via more than one chemical pathway [Winkel, 2006].

BRIEF DESCRIPTION OF THE DRAWINGS

FIG. 1 illustrates copper-doped fused quartz rods prepared using different SiO·CuS composite concentrations and diffusion times.

DETAILED DESCRIPTION

Disclosed herein is a copper dopant delivery powder comprising a fused silica powder and a $Cu_2S$ powder. Further disclosed is a method of making the copper dopant delivery powder. Also disclosed herein is a method of making a copper-doped glass comprising placing a target glass in a container, packing a composite SiO·CuS dopant powder around the target glass and heating the container and SiO·CuS dopant powder to a temperature of between 800° C. and 1150° C. Disclosed herein is a copper-doped glass comprising a glass comprising copper-doping wherein the copper-doped glass was formed by covering the glass with a fused silica powder and a $Cu_2S$ powder, wherein the fused silica powder and the $Cu_2S$ powder are mixed in varying ratios of $Cu_2S$ to silica represented by the formula $(SiO_2)_{(1-x)}(Cu_2S)_x$ and heating to a temperature of between 800° C. and 1150° C.

This invention describes an improved thermal diffusion method for the manufacture of low-concentration, copper-doped fused silica glasses. The invention provides an improved method for fabricating low-concentration, copper-doped fused silica glasses possessing large populations of trapping centers. These glasses have been used for radiation dosimetry applications that utilize OSL and TL phenomena.

The invention relates to the development of novel copper-doped glass materials that possess higher copper concentrations and improved uniformity of doping throughout the glass. The new thermal diffusion method for the fabrication of copper-doped glasses taught in this disclosure has allowed the fabrication of new copper-doped glasses possessing properties that previously could not be obtained.

The new method of fabricating copper-doped glasses has at least the following advantages: the copper dopant concentration can be controlled and can be much higher than was possible in the prior art; the new method of manufacture provides a uniform distribution of Cu' ions throughout the bulk of the silica glass; the new method of manufacture provides doped glasses with much higher radioluminescence yields; and the new method of manufacture retains all the positive features of the prior art.

It is an object of this invention to provide an improved method for preparing glasses that contain copper atoms, ions and clusters that are distributed throughout the volume of the glass without requiring the melting of the glass.

It is another object of the present invention to provide an improved method for diffusing copper into bulk glass objects.

It is another object of the present invention to provide an improved method for diffusing copper into high temperature glass types including, silica, fused silica, quartz, fused quartz, and aluminosilicate glass, where the softening point of the glass is greater than or equal to 800 C.

It is another object of the present invention to provide an improved method for diffusing copper into high temperature glasses at temperatures as low as 800 C.

It is another object of the present invention to provide an improved dopant delivery powder for making doped glasses that upon absorbing ionizing radiation, emit prompt luminescence and store a fraction of the absorbed energy in the form of charges in metastable traps that persist for extended periods of time ranging from seconds to years.

It is another object of the present invention to provide an improved dopant delivery powder for making radiation-sensitive glasses that have the capacity to store between $1 \times 10^{10}$ and $1 \times 10^{18}$ trapped charges per cubic centimeter.

It is another object of the present invention to provide an improved dopant delivery powder for making glasses that are transparent to their luminescent wavelengths.

It is another object of the present invention to provide a dopant delivery powder material for making thermoluminescent glasses.

It is another object of the present invention to provide an improved dopant delivery powder for making optically stimulable luminescent glasses.

It is another object of the present invention to provide an improved dopant delivery powder for making UV-excitable luminescent glasses.

Example 1

The SiO·CuS dopant delivery powder of this invention was tightly packed around several ¼" diameter fused quartz rods placed in an alumina crucible, insuring that there was at least a 5 mm covering of powder over all of the rods. The crucible was placed in a box furnace and heated to 1100 C. Individual rods were removed from the furnace after heating for differing times. The heating times used in this example were 1, 2, 5 and 10 hours. The weight percent of copper in the SiO·CuS powder was 1%, 2%, 5%, and 10%.

Photographs of cross-sections of the rods in room light and under UV illumination are shown in FIG. 1. The photograph taken under room light provides a simple visual indication of the dopant concentrations. The color of the glass is due to the formation of copper oxide and/or copper nanocrystals. As expected, nanocrystal formation is more likely to occur for the higher copper concentrations and for the longer heating times. The photograph taken under UV illumination shows the photoluminescence from the rods. As expected, the photoluminescence is reduced for the more highly doped samples due to absorption of light by the nanocrystals.

Diffusion of high concentrations of copper into high temperature glasses using the methods taught in this disclosure can result in the formation of copper oxide nanoparticles, or copper metal nanoparticles within the volume of the glass. The presence of such nanoparticles is indicated by visible optical absorption bands. The doping conditions that favor the formation of nanoparticles include high doping temperatures and long duration heating.

The method taught in this disclosure provides for the diffusion of copper into solid glass materials to yield copper-doped glasses. The method can also be used to diffuse copper ions into glasses that contain other dopant metal ions, such as transition metal ions or rare earth metal ions. This can result in glasses that are co-doped with more than one type of metal ion. Alternatively, the copper ions may displace the initial metal ion dopants from their defect sites.

There are several advantages and new features disclosed herein.

Example 2

The copper dopant concentration of the SiO·CuS dopant source can be varied and can be orders of magnitude higher than was possible in the prior art. The prior art [Huston, 1998] for thermal diffusion of copper into fused silica glass utilized other doped glasses as the source of copper ions, e.g. doped sol-gel silica films, and doped Vycor glass powder (Vycor glass is a 96% porous silica glass). The copper in the doped sol-gel silica films or Vycor powder was not immediately available to diffuse into the fused silica glass target material. Before the copper ions could diffuse into the fused silica glass target material they had to first diffuse out of the doped source material. The concentration of copper ions that was actually able to diffuse into the fused silica glass target depended on the specific properties of the doped source glass (sol-gel film or Vycor powder) and the temperature of the diffusion process. For example, in either the sol-gel film or the doped Vycor powder the concentration of copper dopant was limited to a value that was only a small fraction of a percent by weight. The low concentration, when combined with the relatively small volume, particularly in the thin sol-gel films, limited the total amount of copper that was available. Raising the diffusion temperature served to increase the effective doping concentration, but there was a fairly narrow range of acceptable diffusion temperatures for each type of glass that was doped. Diffusion at temperatures below the acceptable temperature range caused a dramatic decrease in the amount of copper that diffused into the target glass. Operation at temperatures above the acceptable range damaged the target glass surface and compromised the volume of the glass. Common symptoms of damage were increased roughness of the surface, increased brittleness of the bulk glass, and loss of $Cu^{+1}$ activity (lowered photoluminescence yield and/or TL sensitivity, for example). Increasing the duration of the thermal diffusion procedure allowed more copper to enter the fused silica glass and increased the depth that the copper ions diffused. However, increasing the amount of time that the fused silica glass experienced the high diffusion temperature also caused damage to the glass, similar to what was observed if the temperature was too high.

In summary, the prior art [Huston, 1998] provided extremely limited ability to vary the concentration of the copper ions that diffused into the fused silica glass. The concentrations that could be achieved were extremely low, and the only two parameters that could be varied during the diffusion process were the temperature and duration of the diffusion. Unfortunately, these two parameters had very limited acceptable ranges, and variation of these parameters did not provide effective control of the outcome of the process. Variation of these parameters outside their narrow acceptable ranges resulted in significant damage to the fused silica target glass.

Example 3

The invention of this disclosure provides a novel material that functions as the source of copper ions for the thermal diffusion of copper into fused silica glasses. The new material is a powder dopant delivery composite that contains a mixture of $SiO_2$, $CuS$, $Cu_2S$, $CuO$, and $Cu_2O$ and can be prepared with up to 10 weight percent of copper. The concentration of the copper in the composite is orders of magnitude higher than that in the prior art copper sources (doped sol-gel silica glass and doped Vycor glass). The concentration of silica in the new SiO·CuS dopant delivery powder composite is lower than that in the prior sources, which are 96% to almost 100% silica. Therefore, the amount of diffusion that the copper ions must undergo to leave the dopant source material is significantly reduced compared to the prior art. When heated, the dopant delivery powder of this invention provides a concentration of copper ions that can be easily varied over a wide range and that is much higher than was available in the prior art sources.

Example 4

For example, the diffusion temperature and the amount of time that is required for the diffusion to be completed can both be independently optimized. As described above, the concentration of the copper ions provided by the new composite SiO·CuS dopant delivery powder can be controlled and can be orders of magnitude higher than that of the prior art sources of copper ions (doped sol-gel silica glass film and doped Vycor powder). In the prior art, the concentration of copper in the target glass could be increased primarily by increasing the diffusion temperature. In the prior art, the depth of diffusion could be increased primarily by increasing the duration of the diffusion. Unfortunately, increasing the temperature and/or increasing the duration of the diffusion often caused irreversible damage to the doped target glass.

The new SiO·CuS dopant delivery powder provides a much higher concentration of copper ions than was possible in the prior art. In addition, the new dopant delivery powder can provide high copper ion concentrations at lower temperatures than were used in the prior art. In the prior art, diffusion times of up to 24 hours were typically needed to achieve significant diffusion of copper ions throughout the fused silica target glass. The times required for effective doping of similar fused silica glasses using the method of this invention are on the order of 1-2 hours. The significant reduction in the diffusion time significantly reduces the risk of damage to the doped target glass.

Example 5

The SiO·CuS dopant delivery powder of this invention also can function as the source of copper ions for the thermal diffusion of copper into silicate-based glasses, such as aluminosilicate and borosilicate non-silica glasses. The prior art methods required high diffusion temperatures, above 1000 C, and preferably 1100 C, in order to promote the diffusion of copper ions out of the dopant source glasses (doped sol-gel silica glass films and doped Vycor powder) and diffusion of the those copper ions into the fused silica target glass.

The SiO·CuS composite material of this invention has a much lower concentration of silica glass and provides high copper concentrations at lower temperatures. Doping of glasses that soften at lower temperatures, such as aluminosilicate glasses, is now possible and has been demonstrated. This was impossible using the prior art because the concentrations of copper ions from the doped silica sources at temperatures of ~800 C were too low to allow significant diffusion of metal in silicate-based target glasses. However, increasing the diffusion temperature to that taught in the prior art, ~1100 C, exceeds the softening point of the silicate-based target glasses, and results in the loss of the material.

Example 6

The new method of manufacture provides the ability to control the parameters of the diffusion process to achieve a more uniform distribution of $Cu^{+1}$ ions throughout the bulk of the silica glass.

The thermal diffusion method of the prior art often failed to uniformly dope the entire volume of the fused silica glass.

For example, the cross section of a fused silica rod that had been doped often revealed a doping pattern in the shape of a donut, with a hole in the middle where the glass had not been doped. The appearance of a donut-shaped doped region was related to the diffusion parameters. The cause might have been because the copper ion concentration was too low, or that the diffusion temperature was too low, or that the duration of the diffusion was too short. Another possible reason could be depletion of the copper source in the thin, sol-gel glass film. As discussed above, in the prior art, it is not possible to significantly increase the copper concentration from the source, and the risk of damage to the glass is high if the temperature is increased or the duration of the diffusion is increased. In the prior art, it was often not possible to systematically change the temperature and/or the time spent at high temperature, within the acceptable range of values, and achieve a uniformly doped fused silica sample. The invention of this disclosure provides for higher concentrations of copper ions at a given temperature and it also insures a much greater amount of copper in the SiO·CuS dopant delivery powder such that source depletion is a very unlikely problem.

The method of this invention allows the systematic variation of the temperature and time diffusion parameters over a wide range of values such that uniform doping is successfully achieved. The uniformity of doped silica glass rods has been demonstrated to be extremely high using the invention of this disclosure. The uniformity of the doping is illustrated in the photos in FIG. 1. The photo on the right side of the figure shows ¼" diameter fused silica rods that have been doped at various concentrations of copper in the dopant delivery powder and various heat profiles. The rods are illuminated with an ultraviolet light, causing photoluminescence from the $Cu^{+1}$ ions. The diffusion temperature was fixed at 1100 C for all samples. It is readily apparent upon inspection of the photo that several sets of parameters provide for excellent uniformity. It is also apparent that some parameter pairs resulted in poor uniformity in other samples. The advantage of the method of this disclosure is that such an investigation of the parameter space is feasible. The prior art provided very little or no ability to change the doping concentration. A systematic study changing a variable related to concentration over a useful range simply was not possible in the prior art.

Example 7

The new method of manufacture provides novel doped glasses with much higher radioluminescence yields. The thermal diffusion method of the prior art provided glasses that exhibited outstanding OSL and TL sensitivity, but did not provide glasses with high radioluminescence yields. Compared to other well-known inorganic or organic scintillators, the radioluminescence yields were much smaller. The new method of this invention, as expected, yields doped glasses with outstanding OSL and TL sensitivity, but the method also provides the additional advantage of higher radioluminescence sensitivity. The likely reason for the improved radioluminescence yield is the higher concentration of the copper dopants. The higher radioluminescence yield is expected to have a significant impact on radiation detection applications based on the detection of radioluminescence.

Example 8

The new method of manufacture of this invention retains all the positive features of the prior art methods. The new method allows doping of bulk pieces of glass that have excellent optical transparency, indicating that the copper ions in the glass are predominantly $Cu^{+1}$ ions. There is no visible absorption due to the presence of $Cu^{+2}$ ions.

Example 9

The new method of manufacture of this invention enables the formation of $Cu_2O$ nanocrystals in the target glasses. Such glasses may exhibit plasmon resonance features that are of interest for their nonlinear optical properties and may have novel applications in nonlinear optical devices. The prior art method did not provide copper concentrations high enough to yield nanocrystals.

Example 10

The new method of manufacture of this invention does not generate toxic byproducts. The prior art methods required the generation of toxic $H_2S$, and had to be performed using specialized safety equipment, such as fume hoods. In addition, there is no production of liquid organic hazardous waste.

Example 11

The new method of manufacture of this invention is significantly simpler, cheaper, and less labor intensive than the prior art. For example, the new method eliminates the need to use porous Vycor glass as a source for the copper. Vycor glass has become increasingly more expensive and less readily available. The prior art method that used Vycor glass was the preferred embodiment. A significant motivation for the development of the invention of this disclosure was the desire to abandon Vycor glass due to the expense and the complex procedures required to prepare the doped Vycor powder.

Many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What we claim is:

1. A copper-doped glass formed by placing a target glass in a container, surrounding the target glass with a powder mixture comprised of $SiO_2$ powder and $Cu_2S$ powder, wherein the $SiO_2$ powder and the $Cu_2S$ powder are mixed according to the formula $(SiO_2)_{(1-x)}(Cu_2S)_x$, where $0.01<x<0.1$, heating to a temperature of between 800° C. and 1150° C. for a duration of between 1 and 10 hours; forming a copper-doped glass; and wherein the copper-doped glass comprises copper concentrations from 0.01 weight percent to 10 weight percent.

2. The copper-doped glass of claim 1 wherein the copper-doped glass is luminescent when exposed to ultraviolet light and is transparent to its luminescent wavelength.

3. The copper-doped glass of claim 1 wherein the copper-doped glass, when exposed to ionizing radiation, exhibits prompt radioluminescence and exhibits ionization of a fraction of the copper ions in the copper-doped glass and trapping of electrons at defects in the copper-doped glass.

4. The copper-doped glass of claim 1 wherein the copper-doped glass has the capacity to store between 1E10 and 1E18 trapped electrons or charges per cubic centimeter.

5. The copper-doped glass of claim 1 wherein the copper-doped glass is thermoluminescent and optically stimulable luminescent due to the presence of populated traps that are formed upon exposure to ultraviolet light and/or ionizing radiation.

6. The copper-doped glass of claim 3 wherein release of the trapped electrons is followed by luminescent recombination of the electrons with ionized Cu++ ions.

7. The copper-doped glass of claim 3 wherein release of the trapped electrons is induced by heating.

8. The copper-doped glass of claim 3 wherein release of the trapped electrons is induced by optical stimulation.

* * * * *